the body of grease mixture within the kettle so as

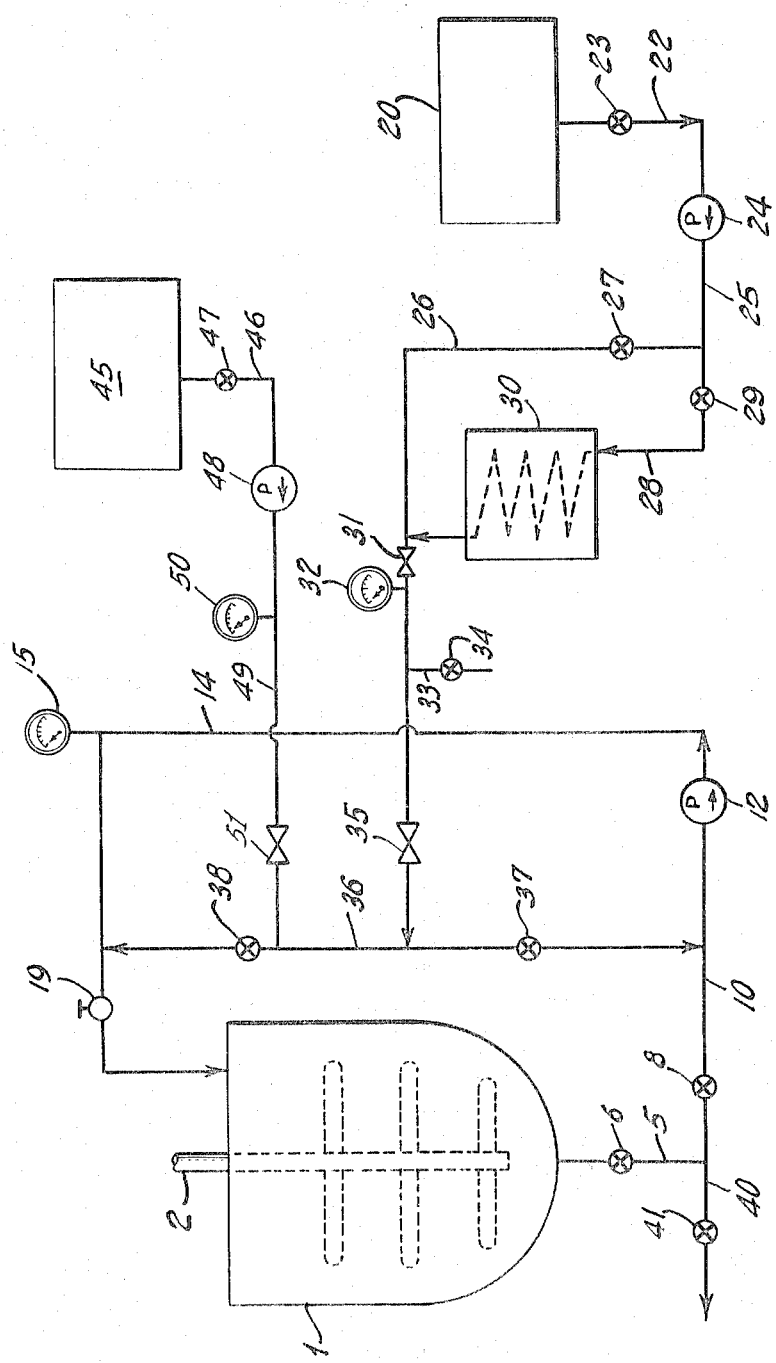

3,242,085
METHOD OF GREASE MANUFACTURE

William B. Green, Jr., Groves, William R. Coons, Jr., Port Arthur, and Herbert J. Pitman, Groves, Tex., and Franklin W. James, Macon, Ga., assignors to Texaco Inc., New York, N.Y., a corporation of Delaware
Filed May 22, 1963, Ser. No. 282,337
15 Claims. (Cl. 252—40.7)

This invention relates to improvements in the manufacture of lubricating greases. It relates particularly to an improved method for the manufacture of water stabilized calcium soap thickened greases.

The preparation of water stabilized calcium soap thickened greases by the prior art methods involves long saponification and dehydration periods due to the difficulty in obtaining complete reaction between the calcium base and the saponifiable material and requires careful supervision to obtain satisfactorily smooth products due to a strong lumping tendency during addition of the water of stabilization and of cold oil after the grease mixture has begun to thicken to a grease consistency. It has been necessary to carry out these preparations on a commercial scale by employing pressure saponification in order to obtain reasonably short manufacturing times.

The present invention obviates the use of pressure saponification in the production of water stabilized calcium soap thickened greases and provides a method for carrying out the preparation of these greases at ordinary pressures with a large reduction in manufacturing times and with the production of greases of improved appearance and yields. Grease preparations in plant size batches carried out by our process under the preferred conditions require only about one fifth the manufacturing time required by open kettle methods of the prior art and approximately five-eighths the manufacturing time required by the pressure kettle method.

In accordance with this invention, water stabilized calcium soap thickened greases are prepared by a convenient open kettle method where by the saponification and dehydration are carried out rapidly in a single step by injecting steam into a recycle stream of the saponification mixture at an elevated temperature. The preferred embodiment of our invention comprises recycling the grease mixture through a shear valve with a substantial pressure drop across the valve during the steam injection and also preferably during the subsequent cooling step while additional oil at a lower temperature is introduced into the recycle stream.

The figure is a diagrammatic illustration of one form of apparatus suitable in making greases in accordance with the preferred embodiment of our invention.

Referring in more detail to the figure, numeral 1 represents a jacketed grease kettle equipped with a stirrer 2 and adapted to be heated to temperatures above about 350° F. In carrying out the grease preparation, the grease kettle is charged with saponifiable material, lubricating oil representing a minor amount of the lubricating oil contained in the finished grease, and a calcium base such as calcium oxide, calcium hydroxide or calcium carbonate in approximately the stoichiometric amount required to react with the saponifiable material. If desired, a small excess of the calcium compound may be employed, such as to give a grease containing up to about 0.5 percent by weight of free alkalinity calculated as calcium oxide. The oil and saponifiable material may be employed in a weight ratio from about 0.1:1 up to about 3:1 respectively, most suitably in a ratio from about 0.2:1 up to about 0.5:1. Heating and stirring of the kettle contents are begun, the stirring being continued throughout the grease making process.

Recirculation of the kettle contents is begun during the heating by turning valves 6 and 8 to the open position and starting pump 12. The saponification mixture passes through line 5, containing valve 6, line 10 containing valve 8, pump 12, and line 14 containing pressure gauge 15 and shear valve 19. As indicated in the figure, the recycle stream is preferably returned at the top of the grease kettle, or at least at a point above the surface of the body of grease mixture within the kettle so as to obtain rapid removal of the added steam. Valve 19 is located a sufficient distance from kettle 1 to avoid spraying of the grease mixture into the kettle when the valve is operated under a back pressure, suitably a distance equal to at least about 12 times the diameter of pipe 14. Lines 5, 10 and 14 may be jacketed or otherwise provided with means for applying additional heating and cooling to the recirculating stream of grease mixture. The shear valve is suitably a gate valve, set in a partly closed position so as to give a pressure drop of about 20–200 pounds per square inch, and preferably about 25–125 pounds per square inch across the valve.

Recirculation of the grease mixture through the recycle line may be begun immediately after charging the kettle, if desired, and carried out continuously throughout the grease making process, with valve 19 preferably in a partly closed position as described above during the saponification and cooling step and very advantageously during heating up to the saponification temperature also. Circulation of the grease mixture during the saponification is suitably carried out at a rate such that the weight of recirculated saponification mixture is equal to the total weight of saponification mixture, i.e., one batch turnover, in from about 0.1 to about 15 minutes, preferably in from about 0.25 to about 10 minutes. Recycling during the cooling cycle is suitably carried out at a rate sufficient to provide a batch turnover in about 0.5–35 minutes, and preferably to about 1–20 minutes, based on the weight of the finished grease, or in about 0.4–27 minutes, and preferably about 0.5–17 minutes, based on the average weight of grease mixture during the cooling step.

When the saponification mixture is at a temperature in about the range 200–400° F., and preferably in about the range 300–350° F., steam is introduced into the recycle line by means of the steam injection system shown in the diagram, comprising water tank 20, heater 30 and auixilary equipment. The water passes from tank 20 to heater 30 by way of line 22 containing valve 23, metering pump 24, line 25, and line 28 containing valve 29. From heater 30 the steam passes into line 36 through line 26 containing diaphragm controlled pressure reducing valve 31, pressure gauge 32 and check valve 35. Bleeder line 22 containing valve 34 is also connected to line 26. In line 36 the steam passes into the recirculating stream of saponification mixture preferably at the discharge side of pump 12 by passing through valve 38 into line 14. The steam is preferably injected at a rate sufficient to give a reaction mixture in the recycle line containing at least about 0.025 percent by weight of steam, and very advantageously at least about 0.050 percent by weight of steam. The maximum rate at which the steam may be injected is limited only by the rate at which it is flashed off after the mixture passes through the shear valve. Boiling over of the kettle contents may result if too much water is retained in the mixture. It is therefore usually preferable not to employ a steam concentration above about 2 percent, although higher concentrations, up to 5 percent or more, may be employed in some cases, particularly when operating at temperatures of at least about 300° F. The steam injection is carried out until the saponification is substantially complete, which will ordinarily require steam injection during the recycling resulting in at least two batch turnovers, and preferably at least about 5 batch turnovers, of the saponification mixture. The steam injection is preferably carried out for a minimum period of about 30 minutes, such as from about 30 to 90 minutes. It is preferably carried out for a period from about 45 minutes to about one hour.

Following the steam injection, the grease mixture obtained by the saponification may be maintained at a temperature in about the range 300–350° F. for a further period up to about 1 hour. However, such a holding period is generally not required when the steam injection is carried out for at least about 30 minutes.

Cooling of the grease mixture is carried out by cutting off the heat to the kettle, and to the recycle line if such additional heating is employed, and introducing lubricating oil from tank 45 into the recirculating stream of grease mixture. The added oil is at a temperature substantially below that of the grease mixture, such as at least about 100° F., and preferably at least about 150° F. below the temperature of the grease mixture at the beginning of the cooling step. The lubricating oil passes from tank 45 through line 46 containing valve 47, metering pump 48, line 49 containing pressure gauge 50 and check valve 51 into line 36. Valve 51 is preferably a spring loaded check valve. Alternatively or in addition line 49 may contain a diaphragm controlled valve (not shown) adjusted so as to prevent the flow of oil through pump 48 when the pump is not operating. In line 36 the oil passes into the recirculating stream of grease mixture at either the intake side of pump 12 by passing through valve 37 into line 10 or at the discharge side of pump 12 by passing through valve 38 into line 14. It preferably passes into the stream of grease mixture at the intake side of pump 12 in order to obtain increased mixing by the action of the pump. The oil may be introduced into the recirculating stream of grease mixture at a rate such that the ratio of the rate of flow of the grease mixture before the point of confluence to the rate of oil injection is from about 1:1 to about 400:1, preferably in a ratio from about 2:1 to about 150:1, and most advantageously in a ratio from about 3:1 to about 50:1, by weight, respectively. Additional cooling may be obtained by passing a cooling fluid through the kettle jacket and optionally through the recirculation line jacket also.

While the grease mixture is being cooled in the range from about 250° F. to about 180° F., water of stabilization is introduced into the recirculating stream of grease mixture from tank 20. The water passes through lines 22 and 25 into line 26 by way of valve 27, bypassing heater 30, and through line 26 into line 36. In line 36 the water may pass into the recirculating stream of grease mixture at either the intake or discharge side of pump 12, as described above in connection with the introduction of the added oil. It preferably passes into the recirculating stream of grease mixture at the discharge side of pump 12, particularly when valve 19 is operated in a partly closed position, in order to avoid vapor locking of the pump. The water is suitably added at a rate of from about 0.0004 to about 0.002 pound per minute per pound of grease mixture, based on the weight of the grease mixture at the end of the oil addition. It is preferably added in an amount such as to give about 1.0 to about 2.5 percent of water in the finished grease.

Shearing of the recycle stream of grease mixture is very advantageously carried out during addition of at least the major portion of the lubricating oil at a lower temperature than the grease mixture and during addition of at least a portion of the water of stabilization. It is preferably discontinued before the grease mixture has cooled below about 210° F. and before the grease mixture begins to thicken to a grease consistency.

The grease preparation may also be carried out with the addition of different stabilizers, such as low molecular weight fatty acids, glycerol monostearate, etc., in place of water. Such stabilizers may be added to the grease mixture as described above in the same manner as when employing water as the stabilizer, or in any other convenient manner.

Calcium soap thickened greases which may be prepared as described above comprise an oleaginous liquid as the chief component thickened to a grease consistency with about 3–30 percent by weight of calcium fatty acid soap, and containing about 0.5–5.0 percent of water or other stabilizer.

The saponifiable materials employed in these grease preparations are high molecular weight fatty acids containing about 10–22 carbon atoms per molecule and the glycerides and other esters thereof. Examples of suitable high molecular weight fatty acid materials which may be employed in the saponification include stearic acid, palmitic acid, myristic acid, lauric acid and the monoesters and glycerides of such acids. A particularly suitable saponifiable material is a tallow containing about 1–10 percent of free fatty acids and having an iodine number of about 40–80.

The lubricating oils forming the major constituent of these greases may be any oils of lubricating characteristics which are suitable for use in lubricating greases generally. Such oils include particularly the conventional mineral lubricating oils having Saybolt Universal viscosities in the range from about 75 seconds at 100° F. to about 225 seconds at 210° F., and which may be either naphthenic or paraffinic oils or blends thereof. The preferred mineral oils are those having Saybolt Universal viscosities in the range from about 300 seconds at 100° F. to about 100 seconds at 210° F., which may be blends of lighter and heavier oils in the lubricating oil viscosity range.

Synthetic lubricating oils which may be preferred for obtaining greases having special properties required for certain types of lubricating service include oils prepared by cracking and polymerizing products of the Fischer-Tropsch process and the like, as well as other synthetic oleaginous compounds such as diesters, polyesters, polyethers, etc., having viscosities within the lubricating oil viscosity range. Examples of suitable diesters include the olefinic dicarboxylic acid diesters, such as di-2-ethylhexyl sebacate, di(secondary amyl) sebacate, di-2-ethylhexyl azelate, di-isooctyl adipate, etc. However, a lubricating oil which is substantially unreactive under the saponification conditions is preferably employed in the saponification mixture. Lubricating oils employed for this purpose are very suitably mineral oils having viscosities of at least about 300 seconds Saybolt Universal at 100° F., which may be mixtures of lighter and heavier oils.

Various additives of the usual types such as corrosion inhibitors, oxidation inhibitors, extreme pressure agents, anti-wear agents, etc., may be employed in these greases. Suitable oxidation inhibitors include particularly those of the amine type, such as, for example, diphenylamine, phenylalphanaphthylamine, tetramethyldiaminodiphenyl methane. Suitable extreme pressure additives include sulfurized fatty oils and lead soaps which may be employed either separately or in combination. Such compounds may be added to the grease mixture during cooling, preferably when the grease mixture is below about 250° F.

The following example is given for the purpose of further disclosing the invention.

*Example I*

A lubricating grease comprising a mineral lubricating oil thickened with calcium tallowate was prepared by a method representing the preferred embodiment of this invention, employing steam injection into a hot recycle stream of saponification mixture with shearing as described below.

The following materials were employed in this preparation:

The mineral lubricating oil employed was a refined naphthenic distillate oil having a Saybolt Universal viscosity at 100° F. of 308 seconds. The saponifiable material was a commercial hard tallow having a free fatty acid content of 4.5 percent, a saponification number of 197, a titer of 41.6° C. and an iodine number of 47.

The equipment employed comprised a 150 pound capacity jacketed steam heated kettle having auxiliary equipment as shown in FIG. 1, including a recycle line containing a positive displacement pump having a variable capacity of 2–10 gallons per minute and a gate valve employed as a shear valve, a steam injection system, and lines for injecting additional lubricating oil into the recycle line.

Following is a detailed description of the method employed in the grease preparation: The kettle was charged with 6.5 pounds of lubricating oil, 19.5 pounds of tallow and 2.94 pounds of lime. Heating and stirring of the kettle contents were begun and at the same time circulation of the kettle contents through the recycle line was begun at a rate of about 2 gallons per minute with a pressure drop across the valve of 60 pounds per square inch gauge. When the temperature of the kettle contents had reached about 315° F., the steam pressure on the kettle jacket was reduced and steam injection into the recycle line was begun at a rate of 0.1 pound per minute and continued for 45 minutes while the saponification mixture was maintained at substantially constant temperature. Heating of the grease mixture was then discontinued and 92.1 additional pounds of lubricating oil were introduced into the recycle stream at the intake side of the pump at a rate of approximately 2.2 pounds per minute while the grease was cooling down to 190° F. During the cooling from 235° F. down to 192° F., 2.3 pounds of water were introduced into the recycle stream at the discharge side of the pump at a rate of 0.1 pound per minute. Shearing of the recycle stream at 60 pounds per square inch pressure drop was carried out during the first part of the oil addition but discontinued at the beginning of the water addition. Stirring was continued for 5 minutes after the water addition was complete, and the grease finally drawn at about 184° F. The total manufacturing time was 2 hours.

A smooth buttery grease of excellent texture and appearance was obtained in good yield. The following analysis and tests were obtained upon this product.

Composition, percent:
- Calcium soap _____ 15.9
- Free fatty acid _____ None
- Free neutral fat _____ 0.19
- Water _____ 1.7
- Mineral oil _____ Remainder Penetration, ASTM at 77° F.:
- Unworked _____ 200
- Worked, 60 strokes _____ 243

Dropping point, ° F. _____ 218

In plant manufactures by the above method, a 30,000 pound batch is prepared in about 5 hours, as compared with about 9 hours by the pressure kettle procedure. The reduction in manufacturing time obtained by our process therefore permits a batch of the grease to be prepared in a single 8 hour work shift, differently from the prior art processes employed in cup grease manufacture.

While the invention has been described with particular reference to water stabilized calcium soap thickened greases, it is obvious that the method comprising carrying out the saponification and dehydration simultaneously by injecting steam into a recycle stream of saponification mixture at an elevated temperature is generally applicable in the manufacture of soap thickened greases as a means of shortening manufacturing times and of carrying out the grease preparation under controlled conditions. The method comprising shearing the grease mixture during the saponification and dehydration carried out in this manner is of particular utility in the manufacture of greases which are difficult to manufacture in suitably smooth form, such as greases thickened with calcium or lithium soaps of fatty acid materials comprising at least a major proportion of hydroxy fatty acid material. By carrying out the saponification with steam injection into the recycle stream in the manner described above, the greases can be sheared during the initial stages of fiber development so as to prevent agglomeration of the soap fibers during this period and without the foaming difficulty which ordinarily results from attempts to shear the grease mixtures during dehydration when the saponification is carried out in the conventional manner. In the preparation of greases of this type the grease mixture is preferably heated for at least about 15 minutes, and ordinarily for at least about 30 minutes, following the saponification step to a temperature from just below the melting point of the soap to about 75° F. below the melting point of the soap with continuous recycle shearing of the grease mixture, and very advantageously with the addition of preheated oil as described in copending application Serial No. 282,330 of L. F. Badgett, W. R. Hencke and F. T. Crookshank, filed of even date herewith. Recycle shearing is preferably carried out during the cooling also with the addition of lubricating oil at a lower temperature as described hereinabove.

Obviously, many modifications and variations of the invention as hereinabove set forth may be made without departing from the spirit and scope thereof and therefore only such limitations should be imposed as are indicated in the appended claims.

We claim:

1. A process for preparing a stabilized calcium soap thickened grease comprising the steps of providing a mixture of saponifiable fatty material, calcium base and lubricating oil comprising a minor portion of the lubricating oil contained in the finished grease, said lubricating oil and said saponifiable fatty acid material being present in said mixture in a weight ratio of from about 0.1 to 3 parts of oil per part of saponifiable material and said calcium base is present in the mixture in approximately the stoichiometric amount required to react with said saponifiable material, heating the said mixture at a temperature in the range from about 200° F. to about 400° F. while treating it with steam until saponification is substantially complete by continuously withdrawing a minor stream from a maintained body of the said mixture in a grease making zone, continuously introducing steam into said withdrawn stream at a rate sufficient to provide a mixture containing at least about 0.025% by weight of steam, and returning the said stream to the said maintained body of mixture, and thereafter cooling the said mixture with the addition of the remainder of the lubricating oil employed in the grease and of a small amount of a stabilizer, the rate of circulation of the mixture during saponification being such that the weight of the recirculated saponification mixture is equal to the total weight of the saponification mixture in from about 0.1 to about 15 minutes, and wherein said stabilizer is selected from the group consisting of water, glycerol monostearate and a low molecular weight fatty acid.

2. The process of claim 1 wherein the said withdrawn stream is returned to the said grease making zone at a point above the surface of the said maintained body of mixture.

3. The process of claim 1 wherein the said stabilizer is water.

4. The process of claim 1 wherein steam is introduced into the said mixture at a temperature in the range 300–350° F.

5. The process of claim 1, wherein steam is introduced into the said mixture for at least about 30 minutes.

6. The process of claim 1 wherein steam is introduced into the said stream of saponification mixture at a rate sufficient to provide a mixture containing at least about 0.050 percent by weight of steam.

7. The process of claim 1 wherein the saponification mixture comprises lubricaitng oil and fatty acid material in a weight ratio of about 0.2–1:1 respectively.

8. The process of claim 1 wherein the said stream of saponification mixture is sheared after the introduction of the said steam by passing it through a shear valve with a pressure drop of about 20–200 pounds per square inch across the said valve.

9. The process of claim 1 wherein cooling of the grease mixture down to about 210° F. is carried out by continuously withdrawing a recycle stream from the said body of mixture, injecting additional lubricating oil at a substantially lower temperature into the said recycle stream, passing the said recycle stream through a shear valve with a pressure drop of about 20–200 pounds per square inch and returning the said recycle stream to the said maintained body of grease mixture.

10. The process of claim 1 comprising the step of adding water to a recycle stream withdrawn from the said maintained body of grease mixture during cooling in the range from about 250° F. to about 210° F., passing the said recycle stream through the shear valve with a pressure drop of about 20–200 pounds per square inch and returning the said recycle stream to the said maintained body of grease mixture.

11. A process for preparing a stabilized soap thickened lubricating grease which comprises providing a substantially anhydrous mixture of saponifiable fatty acid material, basic reacting metal compound and lubricating oil, said lubricating oil and said saponifiable fatty acid material being present in said mixture in a weight ratio of from about 0.1 to 3 parts of oil per part of saponifiable material, and said basic reacting metal compound is present in the mixture in approximately the stoichiometric amount required to react with said saponifiable material, heating the said mixture at a temperature in the range from about 200° F. to about 400° F. while treating it with steam until saponification is substantially complete and thereafter cooling the grease mixture thus obtained and adding any additional lubricating oil employed in the grease, said steam treating being carried out by continuously withdrawing a recycle stream of relatively small volume from a maintained body of the said mixture, injecting steam into said recycle stream at a rate sufficient to provide a mixture containing at least about 0.025% by weight of steam, separating steam therefrom and returning the said recycle stream to the said maintained body of mixture, the rate of circulation of the mixture during saponification being such that the weight of recirculated saponification mixture is equal to the total weight of the saponification mixture in from about 0.1 to about 15 minutes, and adding a small amount of a grease stabilizer selected from the group consisting of water, glycerol monostearate and a low molecular weight fatty acid to said grease during the cooling step.

12. The process of claim 11 wherein the said recycle stream is sheared by passing it through a shear valve with a pressure drop across the said valve of 20–200 pounds per square inch during the steam injection.

13. The process of claim 12 wherein the said shearing is carried out upon the grease mixture during a further heating period following the saponification and during the cooling with the addition of lubricating oil at substantially lower temperature.

14. The process of claim 13 wherein the said saponifiable material comprises at least a major proportion of a hydroxy fatty acid material and wherein the said basic reacting metal compound is a calcium compound.

15. The process of claim 13 wherein the said saponifiable material comprises at least a major proportion of a hydroxy fatty acid material and wherein the said basic reacting metal compound is a lithium compound.

References Cited by the Examiner

UNITED STATES PATENTS

| | | | |
|---|---|---|---|
| 2,332,202 | 10/1943 | Calkins | 252—42.1 |
| 2,920,867 | 1/1960 | Reese et al. | 252—39 |
| 3,068,175 | 12/1962 | Roach et al. | 252—39 |

DANIEL E. WYMAN, *Primary Examiner.*

I. VAUGHN, *Assistant Examiner.*